United States Patent
Zhao et al.

(10) Patent No.: US 12,550,046 B2
(45) Date of Patent: Feb. 10, 2026

(54) METHOD FOR COMMUNICATION, POSITIONING SERVER, ACCESS NETWORK DEVICE, AND TERMINAL DEVICE

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/030,099

(22) Filed: Jan. 17, 2025

(65) Prior Publication Data
US 2025/0175884 A1  May 29, 2025

Related U.S. Application Data

(63) Continuation of application No. PCT/CN2023/097161, filed on May 30, 2023.

(51) Int. Cl.
| | | |
|---|---|---|
| *H04W 48/08* | (2009.01) | |
| *H04W 24/08* | (2009.01) | |
| *H04W 56/00* | (2009.01) | |
| H04W 52/02 | (2009.01) | |

(52) U.S. Cl.
CPC .......... *H04W 48/08* (2013.01); *H04W 24/08* (2013.01); *H04W 56/006* (2013.01); *H04W 52/0209* (2013.01)

(58) Field of Classification Search
CPC ..... H04W 24/08; H04W 24/10; H04W 4/029; H04W 16/28; H04W 48/08; H04W 56/006; H04W 52/0209
See application file for complete search history.

(56) References Cited

U.S. PATENT DOCUMENTS

| | | | |
|---|---|---|---|
| 11,490,393 B2* | 11/2022 | Manolakos | .......... H04B 7/0626 |
| 12,192,143 B2* | 1/2025 | Kim | ...................... H04W 64/00 |
| 12,245,186 B2* | 3/2025 | Bi | .......................... G01S 5/0215 |

(Continued)

FOREIGN PATENT DOCUMENTS

| | | |
|---|---|---|
| CN | 111372308 A | 7/2020 |
| CN | 115150850 A | 10/2022 |

(Continued)

OTHER PUBLICATIONS

International Search Report and Written Opinion in International Appln. No. PCT/CN2023/097161, mailed on Feb. 7, 2024, 10 pages (with partial English translation).

*Primary Examiner* — Mong-Thuy T Tran
(74) *Attorney, Agent, or Firm* — Fish & Richardson P.C.

(57) ABSTRACT

A method for communication, a positioning server, an access network device, and a terminal device are provided. The method includes: transmitting, by a positioning server, first information, where the first information is associated with a terminal device, the first information is used to indicate a first operation, and the first operation is related to one or more of the following: RRM measurement, access of the terminal device, a transmit beam, a receive beam, or a TA. The first operation is related to a behavior for saving energy for the terminal device.

20 Claims, 2 Drawing Sheets

(56) References Cited

U.S. PATENT DOCUMENTS

| | | | | |
|---|---|---|---|---|
| 2013/0203447 A1* | 8/2013 | Hannan | ............... | H04W 64/00 |
| | | | | 455/456.5 |
| 2023/0337082 A1* | 10/2023 | Zhang | ............... | H04B 7/0639 |
| 2023/0362699 A1* | 11/2023 | Yerramalli | ............ | H04W 24/10 |
| 2024/0407046 A1* | 12/2024 | Lee | ...................... | H04W 64/00 |
| 2025/0119861 A1* | 4/2025 | Manolakos | ........... | H04W 24/08 |

FOREIGN PATENT DOCUMENTS

| | | | | |
|---|---|---|---|---|
| CN | 115567866 A | 1/2023 | | |
| CN | 115913478 A | 4/2023 | | |
| EP | 4468752 A1 * | 11/2024 | ............. | H04W 8/24 |
| WO | WO 2022206999 A1 | 10/2022 | | |

\* cited by examiner

METHOD FOR COMMUNICATION, POSITIONING SERVER, ACCESS NETWORK DEVICE, AND TERMINAL DEVICE

CROSS-REFERENCE TO RELATED APPLICATION

This application is a continuation of International Application No. PCT/CN2023/097161, filed on May 30, 2023, the disclosure of which is hereby incorporated by reference in its entirety.

TECHNICAL FIELD

The present application relates to the field of communications technologies, and more specifically, to a method for communication, a positioning server, an access network device, and a terminal device.

BACKGROUND

To reduce power consumption, a communications device may avoid (that is, not perform) some communication behaviors. For example, considering that a relatively large amount of power needs to be consumed for access, for a positioning service, a terminal device may not perform access in a new cell, or the terminal device may not perform access-related radio resource management (RRM) measurement.

In some scenarios, to reduce power consumption, the communications device does not perform a specific behavior or some behaviors, which may however result in an increase in power consumption of the terminal device. The following describes an example that the terminal device does not perform RRM measurement. Because the terminal device does not perform RRM measurement, it is difficult to determine information about a cell (for example, a serving cell and/or a neighboring cell) corresponding to a current location. In one aspect, in a process in which the terminal device performs pilot transmission or reception, invalid pilot transmission or reception may be performed. For example, the terminal device may perform invalid sounding reference signal (SRS) transmission or invalid downlink positioning signal detection. In another aspect, when transmitting an SRS through transmit beam sweeping or receiving a positioning reference signal (PRS) through receive beam sweeping, the terminal device performs invalid transmission or reception. Consequently, resources are wasted. For example, when the terminal device transmits an SRS through beam sweeping, there is no base station in some directions, and therefore, SRS transmission in these directions is invalid, which causes a resource waste and consumes power of the terminal device.

SUMMARY

The present application provides a method for communication, a positioning server, an access network device, and a terminal device. Various aspects involved in the present application are described below.

According to a first aspect, a method for communication is provided. The method includes: transmitting, by a positioning server, first information, where the first information is associated with a terminal device, the first information is used to indicate a first operation, and the first operation is related to one or more of the following: RRM measurement, access of the terminal device, a transmit beam, a receive beam, or a TA.

According to a second aspect, a method for communication is provided. The method includes: receiving, by an access network device, first information transmitted by a positioning server, where the first information is associated with a terminal device, the first information is used to indicate a first operation, and the first operation is related to one or more of the following: RRM measurement, access of the terminal device, a transmit beam, a receive beam, or a TA.

According to a third aspect, a method for communication is provided. The method includes: receiving, by a terminal device, first information transmitted by a positioning server, where the first information is associated with the terminal device, the first information is used to indicate a first operation, and the first operation is related to one or more of the following: RRM measurement, access of the terminal device, a transmit beam, a receive beam, or a TA.

According to a fourth aspect, a positioning server is provided. The positioning server includes a first transmitting unit, transmitting first information, where the first information is associated with a terminal device, the first information is used to indicate a first operation, and the first operation is related to one or more of the following: RRM measurement, access of the terminal device, a transmit beam, a receive beam, or a TA.

According to a fifth aspect, an access network device is provided. The access network device includes a second receiving unit, receiving first information transmitted by a positioning server, where the first information is associated with a terminal device, the first information is used to indicate a first operation, and the first operation is related to one or more of the following: RRM measurement, access of the terminal device, a transmit beam, a receive beam, or a TA.

According to a sixth aspect, a terminal device is provided. The terminal device includes a third receiving unit, receiving first information transmitted by a positioning server, where the first information is associated with the terminal device, the first information is used to indicate a first operation, and the first operation is related to one or more of the following: RRM measurement, access of the terminal device, a transmit beam, a receive beam, or a TA.

According to a seventh aspect, a positioning server is provided, and includes a processor and a memory. The memory is configured to store one or more computer programs, and the processor is configured to invoke the computer program in the memory to cause the positioning server to perform some or all of the steps in the method according to the first aspect.

According to an eighth aspect, an access network device is provided, and includes a processor and a memory. The memory is configured to store one or more computer programs, and the processor is configured to invoke the computer program in the memory to cause the access network device to perform some or all of the steps in the method according to the second aspect.

According to a ninth aspect, a terminal device is provided, and includes a processor, a memory, and a transceiver. The memory is configured to store one or more computer programs. The processor is configured to invoke the computer program in the memory to cause the terminal device to perform some or all of the steps in the method according to the third aspect.

According to a tenth aspect, an embodiment of the present application provides a communications system. The system includes one or more of the positioning server, the access network device, or the terminal device described above. In another possible design, the system may further include another device that interacts with the positioning server, the terminal device, or a network device in the solutions provided in embodiments of the present application.

According to an eleventh aspect, an embodiment of the present application provides a computer-readable storage medium. The computer-readable storage medium stores a computer program, and the computer program causes one or more of a positioning server, an access network device, and a terminal device to perform some or all of the steps of the methods according to the foregoing aspects.

According to a twelfth aspect, an embodiment of the present application provides a computer program product. The computer program product includes a non-transitory computer-readable storage medium that stores a computer program, and the computer program is operable to cause one or more of a positioning server, an access network device, and a terminal device to perform some or all of the steps of the methods according to the foregoing aspects. In some implementations, the computer program product may be a software installation package.

According to a thirteenth aspect, an embodiment of the present application provides a chip. The chip includes a memory and a processor, and the processor may invoke a computer program from the memory and run the computer program, to implement some or all of the steps described in the methods according to the foregoing aspects.

The first operation is related to a behavior for saving energy for the terminal device. The first operation is indicated by the positioning server, so that the positioning server may control an energy saving behavior, to avoid a problem that power consumption is increased.

DETAILED DESCRIPTION OF THE EMBODIMENTS

The technical solutions in the present application are described below with reference to the accompanying drawings.
Communications System
FIG. 1 shows a wireless communications system 100 to which an embodiment of the present application is applied.

The wireless communications system 100 may include a communications device. The communications device may include a network device 110 and a terminal device 120. The network device 110 may be a device that communicates with the terminal device 120. The network device 110 may provide communication coverage for a specific geographic area, and may communicate with the terminal device 120 located within the coverage.

Figure 1:
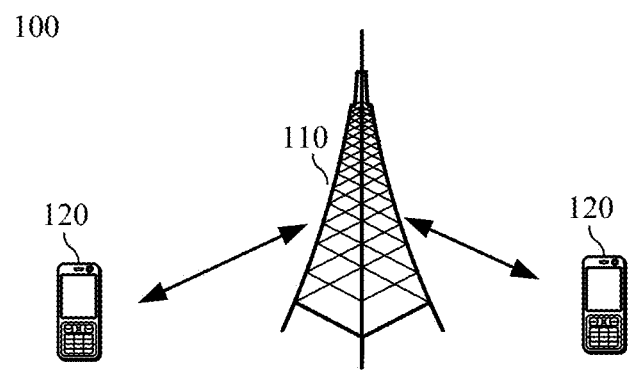
FIG. 1 is a schematic diagram of a wireless communications system to which an embodiment of the present application is applied.

FIG. 1 illustratively shows one network device and two terminals. Optionally, the wireless communications system 100 may include a plurality of network devices, and another quantity of terminal devices may be included within coverage of each network device. This is not limited in the embodiments of the present application.

Optionally, the wireless communications system 100 may further include another network entity such as a network controller or a mobility management entity. This is not limited in the embodiments of the present application.

It should be understood that the technical solutions of the embodiments of the present application may be applied to various communications systems, such as a 5th generation (G) system or new radio (NR), a long term evolution (LTE) system, an LTE frequency division duplex (FDD) system, and a LTE time division duplex (TDD) system. The technical solutions provided in the present application may be further applied to a future communications system, such as a 6th generation mobile communications system or a satellite communications system.

The terminal device in the embodiments of the present application may also be referred to as user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, or a user apparatus. The terminal device in the embodiments of the present application may be a device providing a user with voice and/or data connectivity and capable of connecting people, objects, and machines, such as a handheld device or an in-vehicle device having a wireless connection function. The terminal device in the embodiments of the present application may be a mobile phone, a tablet computer (pad), a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. Optionally, the UE may be used to function as a base station. For example, the UE may function as a scheduling entity, which provides a sidelink signal between UEs in vehicle-to-everything (V2X), device-to-device (D2D), or the like. For example, a cellular phone and a vehicle communicate with each other by using a sidelink signal. A cellular phone and a smart home device communicate with each other, without relaying a communications signal by using a base station.

The network device in the embodiments of the present application may be a device configured to communicate with the terminal device. The network device may further include an access network device. The access network device may also be referred to as a radio access network device, a base station, or the like. The access network device in the embodiments of the present application may be a radio access network (RAN) node (or device) that connects the terminal device to a wireless network. The access network device may broadly cover following various names, or may be replaced with following names, such as a NodeB, an evolved NodeB (eNB), a next generation NodeB (gNB), a relay station, an access point, a transmitting and receiving point (TRP), a transmitting point (TP), a master eNodeB (MENB), a secondary eNodeB (SENB), a multi-standard radio (MSR) node, a home base station, a network controller, an access node, a radio node, an access point (AP), a transmission node, a transceiver node, a baseband unit (BBU), a remote radio unit (RRU), an active antenna unit (AAU), a remote radio head (RRH), a central unit (CU), a distributed unit (DU), a positioning node, or the like. The base station may be a macro base station, a micro base station, a relay node, a donor node, or the like, or a combination thereof. Alternatively, the base station may be a communications module, a modem, or a chip disposed in the device or the apparatus described above. Alternatively, the base station may be a mobile switching center, a device that functions as a base station in D2D, V2X, and machine-to-machine (M2M) communication, a network-side device in a 6G network, a device that functions as a base station in a future communications system, or the like. The base station may support networks of a same access technology or different access technologies. A specific technology and a specific device form used by the access network device are not limited in embodiments of the present application.

The base station may be stationary, or may be mobile. For example, a helicopter or an unmanned aerial vehicle may be configured to function as a mobile base station, and one or more cells may move depending on a location of the mobile base station. In another example, a helicopter or an unmanned aerial vehicle may be configured to serve as a device in communication with another base station.

In some deployments, the network device in the embodiments of the present application may be a CU or a DU, or the network device includes a CU and a DU. The gNB may further include an AAU.

The network device and the terminal device may be deployed on land, including being indoors or outdoors, handheld, or vehicle-mounted, may be deployed on a water surface, or may be deployed on a plane, a balloon, or a satellite in the air. In the embodiments of the present application, a scenario of the network device and the terminal device is not limited.

Communications devices involved in the wireless communications system may include not only the access network device and the terminal device, but also a core network device. The core network device may be alternatively a network device.

The core network device in the embodiments of the present application may include a device that processes and forwards signaling and data from a user. For example, the core network device may include a core network access and mobility management function (AMF), a session management function (SMF), a user plane gateway, a location management function (LMF), and other core network devices. The user plane gateway is typically located on a network side, and may be a server having functions such as mobility management, routing, and forwarding of user plane data, such as a serving gateway (SGW), a packet data network gateway (PGW), or a user plane function (UPF). The AMF and the SMF may be equivalent to a mobility management entity (MME) in an LTE system. The AMF is mainly responsible for admission, and the SMF is mainly responsible for session management. Certainly, a core network may further include another network element. Examples are not listed herein one by one.

It should be understood that all or part of the functions of the communications device in the present application may also be implemented by software functions running on hardware, or by virtualized functions instantiated on a platform (such as a cloud platform).

Positioning Technology

In a communications system, a location-based service (such as navigation positioning) is receiving widespread attention. In a wireless positioning system, a location of a mobile terminal device may be estimated by mapping a signal feature to a spatial location. A positioning method may be based on, for example, one or more of the following manners: ranging, angle, proximity, or fingerprint. Descriptions are separately provided below.

For ranging-based positioning, geometric solids (such as a circle or a hyperbola) may be constructed based on distances from a terminal device to at least three network devices. Further, a positioning result may be obtained by calculating an intersection point between the geometric solids. Time of arrival (TOA) and a time difference of arrival (TDOA) are signal features commonly used in a ranging-based positioning method. In a ranging-based positioning method based on received signal strength (RSS), a path loss model needs to be fitted.

For angle-based positioning, a location of the terminal device may be estimated by calculating angles of arrival (AOA) of at least two input signals.

For proximity-based positioning, a range, covered by a network device, in which the terminal device receives a strongest RSS may be used as a location of the terminal device. The network device generally covers a large range. Therefore, this method is simple but has low positioning accuracy.

For fingerprint-based positioning, an area may be divided into a plurality of reference points. Based on an environment feature, a location of a reference point with a most similar feature may be used as an estimated location of the terminal device. Available signal features may include an RSS and the like. In fingerprint-based positioning, positioning data of each reference point are collected to form a fingerprint. In other words, the accuracy of the fingerprint depends largely on the adequacy of a data set. In addition, compared with the ranging-based positioning method, the fingerprint has a low requirement for hardware. It can be learned that, in the fingerprint-based positioning method, a high-precision positioning result may be obtained through sacrifice of time for collecting training data.

The positioning technology may be implemented by a positioning server, that is, a communications device in a communications system may include the positioning server. The positioning server may implement positioning-related functions such as positioning and positioning management of the terminal device. In some embodiments, the positioning server may also be referred to as a positioning management device. The positioning server in the embodiments of the present application may include an LMF network element or a local location management function (LLMF) located in a network device. This is not limited in the embodiments of the present application.

Low-Power Terminal Device

With the development of technologies, how to reduce power consumption of a terminal device becomes an important research topic. For example, in industries such as logistics, manufacturing, transportation, and energy, the terminal device usually needs to have features such as low costs, a small size (for example, ultra-thin), maintenance-free, and a long service life. For this requirement, a low-power communications technology is proposed. A low-power communications system may be used in scenarios such as a wireless industrial sensing network, intelligent agriculture, intelligent warehousing and logistics, and smart household.

A low-power terminal device may meet one or more of the following requirements: no battery, a small battery capacity, low power consumption, a low cost, applicability to an extreme environment, a small size, and the like. In some embodiments, the low-power terminal device may also be referred to as a zero-power communications device.

To reduce power consumption, the terminal device and/or a network device may avoid (that is, not perform) some communication behaviors. Access of the terminal device is used as an example. When the terminal device moves between cells, considering that a relatively large amount of power needs to be consumed for access, for a positioning service, the terminal device may not perform access in a new cell. Similarly, considering power consumption for performing RRM measurement, the terminal device may not perform RRM measurement. In a case that no access is performed and/or no RRM measurement is performed, the terminal device may still perform a positioning-related operation based on a previous configuration. For example, the terminal device may transmit an uplink positioning SRS and detect a downlink positioning signal (for example, a downlink PRS) based on the previous configuration.

In some scenarios, to reduce power consumption, the communications device does not perform a specific behavior or some behaviors, which may however result in an increase in power consumption of the terminal device. The following describes an example that the terminal device does not perform RRM measurement. Because the terminal device does not perform RRM measurement, it is difficult to determine information about a cell (for example, a serving cell and/or a neighboring cell) corresponding to a current location. In one aspect, in a process in which the terminal device performs pilot transmission or reception, invalid pilot transmission or reception may be performed. For example, the terminal device may perform invalid SRS transmitting or invalid downlink positioning signal detection. In another aspect, when transmitting an SRS through transmit beam sweeping or receiving a PRS through receive beam sweeping, the terminal device performs invalid transmitting or receiving. Consequently, resources are wasted. For example, when the terminal device transmits an SRS through beam sweeping, there is no base station in some directions, and therefore, SRS transmission in these directions is invalid, which causes a resource waste and consumes power of the terminal device.

In view of the foregoing situation, the present application proposes that a positioning server indicates a behavior (for example, a first operation described below) of a terminal device and/or a network device, to avoid a problem that power consumption is increased. The method provided in the embodiments of the present application is described below as an example with reference to FIG. 2.

Figure 2:
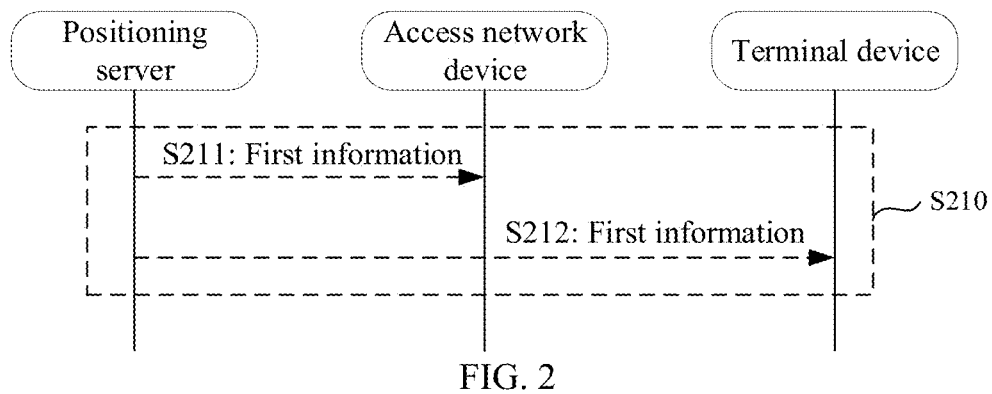
FIG. 2 is a schematic flowchart of a method for communication according to an embodiment of the present application.

FIG. 2 is a schematic flowchart of a method for communication according to an embodiment of the present application. The method shown in FIG. 2 may be performed by a positioning server. The method shown in FIG. 2 may be alternatively performed by a terminal device and/or a network device. The network device may include a core network device and/or an access network device. The access network device may include, for example, one or more of the following: an access network device corresponding to one or more serving cells of a terminal device, an access network device corresponding to a cell to be accessed by a terminal device, or an access network device corresponding to one or more neighboring cells of the terminal device. For example, the core network device may include an AMF network element. In the example shown in FIG. 2, the network device is an access network device. It should be noted that, in some embodiments, some or all operations performed by the positioning server in the present application may be alternatively performed by a core network element.

The method shown in FIG. 2 may include Step S210. Step S210: A positioning server transmits first information.

The first information may be used to indicate a first operation. The first operation may be an operation affected by movement of a terminal. An execution situation of the first operation may affect power consumption of a terminal device. For example, a parameter of the terminal device changes due to the movement of the terminal. The positioning server may obtain a parameter change of the terminal device based on a location estimation or a measurement object for estimation of the terminal device. The first operation may be an operation performed by a network device and/or the terminal device when being notified by the positioning server based on the parameter change. In other words, the positioning server may determine the parameter change of the terminal device based on the location estimation or a measurement object for location estimation of the terminal device. The first operation may be determined based on the parameter change of the terminal device. The location estimation may be a location (such as coordinates, a distance, or an angle) of the terminal device that is estimated by the positioning server. The measurement object for location estimation may be a measurement object (for example, a measured value of a signal used for positioning) used to estimate a location.

In some embodiments, the first operation may be related to one or more of the following: RRM measurement, access of the terminal device, a transmit beam, a receive beam, or TA adjustment. For example, the first operation may be one or more of the following operations: RRM measurement, access of the terminal device, TA adjustment, or the like. Alternatively, the first operation may be an operation associated with one or more of the following operations: RRM measurement, access of the terminal device, TA adjustment, or the like.

The first information may indicate one or more of: whether to perform the first operation, parameter information related to the first operation, or the like.

Step S210 may include Step S211 and/or Step S212. Step S211: The network device receives the first information. Step S212: The terminal device receives the first information. In other words, a receiving party of the first information may be the network device and/or the terminal device.

The first operation may be an operation performed by the terminal device, or may be an operation performed by the network device. Based on this, an executor of the first operation and the receiving party of the first information may be the same, or may be different.

In a case that the executor of the first operation is the same as the receiving party of the first information, the positioning server may guide or indicate an operation of the executor by using the first information, so that the operation of the executor can reduce energy consumption of the terminal device. For example, in a case that the first operation is an operation performed by the terminal device, if the receiving party of the first information is the terminal device, the positioning server may guide or indicate the first operation of the terminal device by using the first information, so that the terminal device performs a corresponding behavior according to an instruction of the positioning server.

In a case that the executor of the first operation is different from the receiving party of the first information, the positioning server may notify, by using the first information, the receiving party of an operation that may be performed by the executor, so that the receiving party adjusts a communication process based on the operation of the executor to avoid a communication fault. In a case that the first operation is performed by the terminal device, if the receiving party of the first information is the network device, the positioning server may notify, by using the first information, the network device of a behavior that may be performed by the terminal device, so that the network device adaptively adjusts a behavior for the terminal device.

A manner of determining the first information is not limited in the present application. For example, the first information may be determined based on one or more of: cell information of a cell to which the terminal device belongs or information about the terminal device, which are respectively described below.

First, the cell information of the cell to which the terminal device belongs is described.

The cell to which the terminal device belongs may include a cell that covers the terminal device. In other words, a cell that can cover a location of the terminal device may be referred to as the cell to which the terminal device belongs. Alternatively, a cell that can be accessed by the terminal device may be the cell to which the terminal device belongs. The cell to which the terminal device belongs may include, for example, a serving cell and/or a neighboring cell of the terminal device.

In an implementation, the cell information may include an identifier of a cell, to distinguish between information of different cells.

In an implementation, the cell information may include measurement information of a first signal in the cell. The positioning server may determine a movement status of the terminal device based on the measurement information. The movement status of the terminal device may include one or more of the following: a first location of the terminal device, a second location of the terminal device, a moving speed of the terminal device, or the like. The first location may be a location of the terminal device in an original cell. Alternatively, the first location may be a location of the terminal device at a first moment (for example, a historical moment). The original cell may be an original camped-on cell or an original accessed cell of the terminal device. The second location may be a location that the terminal device arrives at after moving from the first location for a period of time. In other words, the second location may be a location of the terminal device at a second moment (for example, a current moment). Based on the movement status of the terminal device, the positioning server may determine whether the terminal device moves out of an area covered by the original cell, so as to further determine whether to require the terminal device to perform an operation such as RRM measurement, cell reselection, or access.

The first signal may be a signal transmitted and/or received by the terminal device in the cell to which the terminal device belongs. For example, the first signal may include one or more of the following signals: a synchronization signal/PBCH block (SSB), a channel state information reference signal (CSI-RS), a cell-specific reference signal (CRS), an SRS, a PRS, or the like.

The measurement information may indicate a measurement result of the first signal. For example, the measurement information may include one or more of the following measurement results: reference signal received power (RSRP), reference signal received quality (RSRQ), a received signal strength indicator (RSSI), or a signal to interference plus noise ratio (SINR).

For ease of understanding, the following describes an example that the cell to which the terminal device belongs includes a serving cell. In this case, the cell information may include a serving cell ID and a measurement value of the serving cell. The measurement value of the serving cell may include one or more of: an SSB index, SSB RSRP, SSB RSRQ, an SSB RSSI, an SSB SINR, CSI-RS RSRP, a CSI-RS RSSI, CSI-RS RSRQ, a CSI-RS SINR, CRS RSRP, a CRS RSSI, CRS RSRQ, or a CRS SINR.

For another example, in a case that the cell to which the terminal device belongs includes a neighboring cell, the cell information may include a neighboring cell ID and a measurement value of the neighboring cell. The measurement value of the neighboring cell may include one or more of: an SSB index, SSB RSRP, SSB RSRQ, an SSB RSSI, an SSB SINR, CSI-RS RSRP, a CSI-RS RSSI, CSI-RS RSRQ, a CSI-RS SINR, CRS RSRP, a CRS RSSI, CRS RSRQ, or a CRS SINR.

Related content of the cell information is described above, and the information about the terminal device is described below. The information about the terminal device may include information related to the terminal device. The positioning server may specifically provide, based on the information about the terminal device, first information that meets a condition or a requirement of the terminal device, to save energy.

In an implementation, the information about the terminal device may include power consumption information of the terminal device. The positioning server may determine the first information (that is, determine how to indicate the first operation) based on the power consumption information. For example, the first operation is related to RRM measurement. If the terminal device performs receiving and/or transmitting by using a beam that does not match a surrounding environment, relatively high power is consumed. In this case, the positioning server may indicate, based on whether the terminal device consumes relatively high power, a situation of performing RRM measurement by the terminal device. For example, in a case that power consumption of the terminal device is greater than or equal to a power consumption threshold, the positioning server may indicate, by using the first information, the terminal device to perform RRM measurement. In a case that the power consumption of the terminal device is less than the power consumption threshold, the positioning server may indicate, by using the first information, the terminal device not to perform RRM measurement.

In an implementation, the information about the terminal device may include positioning information of the terminal device. The positioning information of the terminal device may include information related to positioning of the terminal device. For example, the positioning information of the terminal device may include one or more of: a positioning result (for example, location information of the terminal device) obtained by using a positioning process, intermediate information (for example, a measurement value of a positioning signal transmitted or received by the terminal device, and fingerprint information) in the positioning process, other information (for example, a moving speed, an angle, or a deviation of the terminal device) obtained based on the positioning result, the movement status of the terminal device (for descriptions of the movement status, refer to the foregoing descriptions), or the like.

Compared with an access network device, the positioning server may obtain more accurate positioning information with reference to more information. For example, for the cell to which the terminal device belongs, it is difficult for an access network device corresponding to the cell to obtain information such as positioning detection accuracy and mobility. Therefore, the positioning server may obtain more accurate and complete positioning information of the terminal device, so that the first information may be more accurately determined.

In some embodiments, the positioning information of the terminal device may include fingerprint information used to position the terminal device, mobility information of the terminal device, and positioning deviation information of the terminal device.

The fingerprint information used to position the terminal device is obtained by using the foregoing fingerprint-based positioning method. The positioning server may determine, based on the fingerprint information, whether the terminal device leaves the original cell or whether an RRM measurement result has changed, to determine an indication related to RRM measurement.

The mobility information of the terminal device may be used to indicate the movement status of the terminal device (for descriptions of the movement status, refer to the foregoing descriptions). For example, the positioning server may determine, based on the mobility information, a deviation, from the original cell, of a location to which the terminal device moves. The positioning server may determine whether the terminal device moves out of the original cell. Based on this, the positioning server may determine information related to the first operation. For example, the positioning server may determine the indication related to RRM measurement.

A location of the terminal that is reported by the cell to which the terminal device belongs may be referred to as a reported location. A location of the terminal that is determined by the positioning server may be referred to as a determined location. It may be learned from the foregoing descriptions that the positioning server may determine the location of the terminal device based on information reported by a plurality of cells. Therefore, the location (that is, the determined location) of the terminal device that is determined by the positioning server is more accurate. The positioning deviation information may be used to indicate a deviation between the reported location and the determined location. The positioning server may determine, based on the foregoing deviation, whether to require the terminal device to perform access or RRM measurement. For example, the RRM measurement includes measurement related to cell reselection. The positioning server may determine whether the terminal device performs measurement related to reselection.

It should be noted that the information about the terminal device and/or the cell information may be transmitted by the access network device and/or the terminal device to the positioning server, or may be calculated by the positioning server.

Content indicated by the first information is described in detail below.

In a case that the first operation is related to RRM measurement, the first information may be used to indicate one or more of: a measurement cycle of RRM measurement, whether the terminal device is required to perform RRM measurement, whether the terminal device is required to report an RRM measurement result, or a first measurement threshold for triggering the terminal device to perform the first operation.

The terminal device needs to evaluate the validity of an SRS before transmitting the SRS. Therefore, the RRM measurement cycle affects SRS validity verification. In a related technology, SRS validity verification is implemented based on an RRM measurement process prior to paging detection (which may be alternatively referred to as paging reception) or discontinuous reception (DRX). However, in a case that a DRX cycle or a paging detection cycle is relatively long, the RRM measurement cycle also increases correspondingly, thereby reducing validity of the SRS verification. For example, in the related technology, for a terminal device in a radio resource control (RRC) inactive (RRC_INACTIVE) state, a longer extended discontinuous reception (eDRX) cycle may be configured for the terminal device. The eDRX cycle may last up to 2.9 hours. In this case, reusing the RRM measurement process before DRX inevitably reduces the validity of the SRS verification. In other words, there may be a case in which the RRM measurement cycle is excessively long in the related technology, and the validity of the SRS verification is reduced. However, in a case that the RRM measurement cycle is relatively short, there are also some problems in a communication process. For example, for the SRS verification, a separate RRM measurement cycle may be used. The RRM measurement cycle may be, for example, the same as an SRS transmission cycle. Consequently, RRM measurement is performed excessively frequently, and more power of the terminal device is consumed.

In the present application, the positioning server determines a measurement cycle for RRM measurement, to set a proper RRM cycle, so that power consumption of the terminal device is reduced as much as possible while ensuring the validity of the SRS verification. The measurement cycle may be determined based on one or more of a paging detection cycle, a DRX cycle, or positioning information of the terminal device.

The measurement cycle of RRM measurement may be less than the DRX cycle or a paging detection cycle. For example, when the terminal device is in RRC_INACTIVE, if the terminal device is configured with a DRX state, an RRM measurement cycle that is shorter than the DRX cycle may be configured for the terminal device.

For the positioning information of the terminal device, refer to the foregoing descriptions. In other words, the positioning server may determine, based on one or more pieces of information about the movement status or a location status of the terminal device, a measurement cycle of RRM measurement that is indicated by the first information.

When the measurement cycle of RRM measurement arrives, RRM measurement is not necessarily performed. In other words, the terminal device may perform RRM measurement, or may not perform RRM measurement. Whether to perform RRM measurement may be indicated by using the first information. For example, the first information may indicate one of the following: the terminal device performs RRM measurement or the terminal device does not perform RRM measurement. Alternatively, when RRM measurement needs to be performed, the positioning server may transmit the first information, and when RRM measurement does not need to be performed, the positioning server may not transmit the first information.

The first information may indicate whether to report an RRM measurement result by the terminal device. The terminal device needs to apply for an uplink resource and perform uplink transmission in order to report the RRM measurement result. This consumes a relatively large amount of power of the terminal device. Based on the present application, the terminal device may not report the RRM measurement result. The terminal device may determine, according to an indication of the first information, whether to report the RRM measurement result.

In an implementation, the first information may include a second measurement threshold. The terminal device may determine, based on the second measurement threshold, whether to perform RRM reporting. The second measurement threshold may be a threshold for a difference between measurement values (for example, a difference between RSRPs). Whether the terminal device is required to report the measurement result of the RRM measurement (which is referred to as an RRM measurement result for short below) may be determined based on a result of comparison between the measurement result and the second measurement threshold. In some embodiments, in a case that a difference between the measurement result and a result of historical RRM measurement (which is referred to as a historical result for short) is greater than or equal to the second measurement threshold, the terminal device is required to report the measurement result. The historical result may be any RRM measurement result before current RRM measurement. The difference between the measurement result and the historical result may include: the measurement result minus the historical result, and/or the historical result minus the measurement result. For example, in a case that a difference between a current RRM measurement result and a previous RRM measurement result is greater than or equal to the second measurement threshold, the terminal device may report a measurement result of current RRM measurement.

The first information may indicate the first measurement threshold for triggering the terminal device to perform the first operation. The first measurement threshold may include one or more of thresholds for the following measurement objects: RSRP, RSRQ, an RSSI, or a SINR. For example, the first operation is related to RRM measurement. In a case that the measurement value is greater than or equal to the first measurement threshold, the terminal device may perform RRM measurement. In a case that the measurement value is less than the first measurement threshold, the terminal device may not perform RRM measurement.

In an implementation, if the terminal device is in the serving cell, the positioning server may notify, by using the first information, the serving cell of a value of a measurement object, of the terminal device in a relative cell in a range of the serving cell, that requires the terminal device to re-perform RRM measurement. The relative cell may be the serving cell, or the serving cell and a neighboring cell.

It should be noted that the first measurement threshold may be estimated by the positioning server based on information such as a fingerprint.

In a case that the first operation is related to access of the terminal device, the first information may be used to indicate one or more of: information about whether to perform access by the terminal device or information about a cell reselected for the terminal device. In this case, the first information may be transmitted to the reselected cell and/or an access network device corresponding to the serving cell.

Whether to perform access by the terminal device and/or the cell reselected for the terminal device may be determined by the positioning server. The access network device corresponding to the serving cell of the terminal device and/or the reselected cell may transmit a paging instruction. The paging instruction may be used to page the terminal device to perform access in the reselected cell. The paging instruction may be a core network (CN) paging instruction. In addition, for paging, a network side may instruct, by using a physical downlink control channel (PDCCH) or a physical downlink shared channel (PDSCH), the terminal device to perform the first operation (for example, access or RRM measurement).

Because an original accessed cell is far from a user, the newly reselected cell, instead of the original cell, forwards the RAN-initialed paging PDCCH, or the reselected cell transmits CN (Core network) paging.

In some embodiments, when the reselected cell forwards first signaling of the serving cell for the terminal device, information such as a paging opportunity occupied by the signaling is the same as that of the original cell of the terminal device. The first signaling may be one or more of a paging message or a paging early indication (PEI).

It should be noted that, different from the related technology, the paging instruction may be transmitted only by the reselected cell and/or the serving cell. In other words, not all cells in a tracking area need to send the paging instruction. In this case, the positioning server or the AMF may issue paging to only the access network device corresponding to the serving cell and/or the reselected cell.

In some embodiments, if the terminal device camps on or accesses the reselected cell, the terminal device and/or an access network device corresponding to a newly camped-on or newly accessed cell (that is, the reselected cell) may report to the positioning server that the terminal device camps on or accesses the reselected cell. The positioning server or the AMF may notify the original cell that the terminal device camps on or accesses the reselected cell. Correspondingly, the original cell may update related information of the terminal device.

In a case that the first operation is related to the transmit beam and/or the receive beam, the first information may be used to indicate beam information of the terminal device and/or the access network device. For example, in a case that the first operation is related to the transmit beam, the first information may be used to indicate one or more of: beam information of a transmit beam of the access network device relative to the terminal device, or the beam information of the transmit beam of the access network device relative to the terminal device. For another example, in a case that the first operation is related to the receive beam, the first information may be used to indicate one or more of: beam information of a receive beam of the access network device relative to the terminal device, or the beam information of the receive beam of the access network device relative to the terminal device. The beam information includes but is not limited to an angle and/or a width of a corresponding beam.

As described above, the first operation may be related to the TA. In a case that the terminal device moves, the TA may be invalid. In this case, the terminal device may autonomously adjust the TA. For example, when the terminal device performs estimation by using a downlink reference time difference, the terminal device may autonomously adjust the TA.

If the TA is adjusted by the terminal device, that is, the network device does not participate in adjustment of the TA, it is difficult for the network device to determine whether the TA of the terminal device is adjusted. Consequently, the network device subsequently cannot continue to implement communication control, and consequently, a communication fault is caused. For example, the network device may transmit a TA adjustment quantity to the terminal device. In a case that the terminal device has adjusted the TA autonomously, because the network device is unaware that the terminal device has adjusted the TA autonomously, the TA adjustment quantity transmitted by the network device is still determined based on a previous unadjusted value. Consequently, a TA fault is caused.

It is proposed in the present application that in a case that the first operation is related to the TA, the first information may be used to indicate estimation information of the TA of the terminal device that is estimated by the positioning server. In other words, the positioning server may estimate a TA status of the terminal device, and transmit the estimated TA status by using the first information. The estimation information of the TA may be transmitted to the access network device, so that the network side can learn the TA status of the terminal device.

The estimation information of the TA may include one or more of the following: an indication of whether the TA is adjusted by the terminal device, a TA value adjusted by the terminal device, or the like.

It may be understood that, in a case that the terminal device adjusts the TA autonomously, the terminal device may transmit a status of adjusting the TA to the network device, so that the network device is aware of an update status of the TA. However, this may lead to a case in which the terminal device has to access the cell, or the terminal device has to enter a connected state, so as to obtain an uplink resource and transmit, by using the uplink resource, a status of autonomously adjusting the TA by the terminal device. It may be understood that this process consumes a large quantity of resources. In the present application, the positioning server estimates the TA status of the terminal device, and transmits the estimation information to the access network device, so that energy consumption of the terminal device is reduced while the network side is aware of the TA status.

In addition, if the access network device estimates a TA adjustment status of the terminal device, the process is relatively complex. For example, the access network device may perform uplink SRS estimation. A delay from a time of sending a downlink RS to a time of arrival of the SRS may include a propagation delay and a TA. However, a base station cannot obtain information about whether the TA is adjusted by the terminal device. Therefore, in the present application, the positioning server estimates the TA status of the terminal device, so as to simplify the process performed by the network side to determine that the terminal device adjusts the TA. For example, if a status of adjusting the TA by the terminal device is estimated by the access network device, the serving cell estimates only time of arrival of a signal. Even if the serving cell can estimate a time difference, i.e., a difference between time of transmission and arrival, the serving cell still cannot estimate the TA because the serving cell cannot determine the location of the terminal device and thus cannot determine a delay between sending and receiving of a signal. It is assumed that time of receiving an uplink pilot by the base station is $t_1$, time of transmitting a downlink pilot by the base station is $t_2$, and a time difference between receiving of the downlink pilot and transmitting of the uplink pilot by the terminal device is T. From a perspective of the base station, a propagation delay d, impacted by TA, between the base station and the terminal device may be:

$$d = (t_1 - t_2 - T)/2.$$

It may be understood that the d includes a timing advance and the propagation delay between the base station and the terminal. A larger timing advance leads to a smaller value of d, and a smaller propagation delay between the base station and the terminal leads to a smaller value of d. Because d includes the timing advance and the propagation delay between the base station and the terminal, the base station obtains information about d, but does not know whether the timing advance is adjusted. However, the positioning server may obtain the location of the terminal device through estimation based on reporting results of a plurality of base stations, so as to obtain the propagation delay between the base station and the terminal. Each base station may report a value of d of the base station, and the positioning server determines, based on the propagation delay, d, and a TA that is notified by a previous serving cell, whether the TA is adjusted, and notify the serving cell.

In some embodiments, an access network device corresponding to the cell (for example, the serving cell) to which the terminal device belongs may report a TA value of the terminal device in the cell to which the terminal device belongs (a TA value configured by the access network device for the terminal device or a TA value that is not adjusted by the terminal device) to the positioning server. In addition, the access network device may further notify the positioning server of one or more of the following TA-related information: time of arrival to be measured by each cell, a delay of time of arrival of an SRS relative to transmission of a downlink RS, or a propagation delay estimated after TA impact is removed.

Based on the TA value reported by the access network device and/or the foregoing TA-related information, the positioning server may determine whether the TA is adjusted by the terminal device. For example, the positioning server may estimate the location of the terminal device based on information transmitted by each access network device for positioning, to obtain a new location (for example, a current location) of the terminal device. Further, the positioning server may calculate or estimate an estimated TA of the terminal device at the new location. The positioning server may compare the estimated TA with a TA reported by the serving cell, to determine whether the TA is adjusted by the terminal device. If the positioning server determines that the TA is adjusted by the terminal device, the positioning server may notify the access network device corresponding to the serving cell by using the first information. The first information may indicate that the TA is adjusted by the terminal device and/or an estimated value of the TA.

The positioning server determines, based on the following formula, whether the timing advance changes: $d - \Delta d - TA\_old > n \times \Delta TA$, where d is a propagation delay that includes a TA and that is reported by the serving cell, TA_old is the TA value of the terminal device in the cell to which the terminal device belongs, $\Delta d$ is a propagation delay estimated by the positioning server, $\Delta TA$ is a quantization interval of the TA, and n is a number greater than 0. n may be predefined in a standard and/or indicated by higher layer signaling.

That the terminal device autonomously adjusts the TA is described below. Within a validity area, whether the TA is valid may be determined based on a change in RSRP and/or downlink reference time. For example, the network device may indicate a first threshold for a change in the RSRP and a second threshold for a change in the downlink reference time to the terminal device. In a case that the change in the RSRP is less than the first threshold and/or the change in the downlink reference time is less than the second threshold, it may be considered that the downlink reference time and/or the RSRP change slightly. A small change in the downlink reference time and/or RSRP may be caused by a measurement error or the like. Therefore, the terminal device may not need to adjust the TA value to obtain a new "valid TA value". Similarly, if the downlink reference time and/or the RSRP change because the terminal device changes a measured SSB, the terminal device does not need to autonomously adjust the TA. However, if the change in the RSRP is greater than or equal to the first threshold and/or the change in the downlink reference time is greater than or equal to the second threshold, that is, the downlink reference time and/or the RSRP change significantly, the terminal device may adjust the TA to compensate for a downlink timing difference, so as to keep uplink timing constant. This is because the significant change in the downlink reference time and/or the RSRP is likely due to a relatively large transmission time difference between a previously camped-on cell and a new accessible cell. Therefore, the terminal device may adjust the TA.

It should be noted that the foregoing RSRP may be obtained by measuring a reference signal. The positioning server may notify the access network device of one or more of the following: a reference signal measured for obtaining the RSRP, a cell to which the reference signal belongs, or a related threshold (a first threshold and/or a second threshold) for the reference signal. The first threshold and/or the second threshold may be adjusted by the network side, to control the terminal device to keep a proper or constant TA.

It should be noted that the first information may be indicated in one or more of the following manners: a PEI or a sequence. For a terminal device in an inactive state, by indicating the first information in this manner, the terminal device can be prevented from performing an operation such as access, thereby reducing power consumption of the terminal device.

It should be noted that the terminal device or the network device that receives the first information may perform a corresponding operation with reference to a recommendation of the first information. In other words, a receiving party of the first information may perform a corresponding operation based on the first information, or may perform a corresponding operation without referring to the first information. For example, the first information is used to indicate a measurement cycle of RRM measurement, and the positioning server may notify, by using the first information, the access network device of a recommended measurement cycle of RRM measurement. This recommendation may be referred to when the access network device configures the RRM measurement cycle. An RRM measurement cycle actually configured by the access network device may be the same as or different from an indication of the first information.

The foregoing describes the method embodiments of the present application in detail. The following describes apparatus embodiments of the present application in detail. It should be understood that the description of the method embodiments corresponds to the description of the apparatus embodiments, and therefore, for a part that is not described in detail, reference may be made to the foregoing method embodiments.

Figure 3:
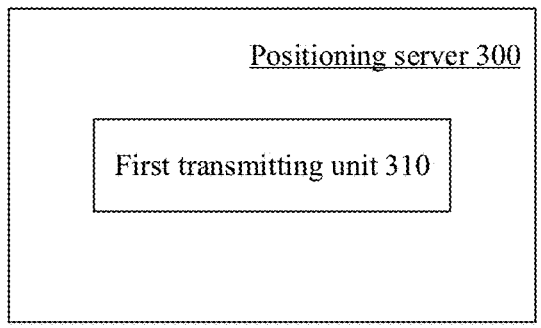
FIG. 3 is a schematic structural diagram of a positioning server according to an embodiment of the present application.

FIG. 3 is a schematic structural diagram of a positioning server 300 according to an embodiment of the present application. The positioning server 300 may include a first transmitting unit 310.

The first transmitting unit 310 is configured to transmit first information. The first information is associated with a terminal device, the first information is used to indicate a first operation, and the first operation is related to one or more of the following: RRM measurement, access of the terminal device, a transmit beam, a receive beam, or a TA.

In some embodiments, the first transmitting unit is specifically configured to transmit the first information to the terminal device and/or an access network device. The access network device includes one or more of the following devices: an access network device corresponding to one or more serving cells of the terminal device, an access network device corresponding to a cell to be accessed by the terminal device, or an access network device corresponding to one or more neighboring cells of the terminal device.

In some embodiments, the first operation is determined based on a parameter change of the terminal device, and the parameter change of the terminal device is determined by the positioning server based on a location estimation of the terminal device or a measurement object for location estimation of the terminal device.

In some embodiments, the first information is determined based on one or more of: cell information of a cell to which the terminal device belongs, where the cell to which the terminal device belongs includes a cell that covers the terminal device; or information about the terminal device.

In some embodiments, the cell information includes measurement information of a first signal in the cell to which the terminal device belongs.

In some embodiments, the first signal includes one or more of the following signals: a synchronization signal/PBCH block SSB, a channel state information reference signal CSI-RS, or a cell-specific reference signal CRS.

In some embodiments, the measurement information includes one or more of the following measurement results: RSRP, RSRQ, an RSSI, or a SINR.

In some embodiments, the information about the terminal device includes one or more of: power consumption information of the terminal device or positioning information of the terminal device.

In some embodiments, the positioning information of the terminal device includes fingerprint information used to position the terminal device, mobility information of the terminal device, and positioning deviation information of the terminal device.

In some embodiments, in a case that the first operation is related to RRM measurement, the first information is used to indicate one or more of: a measurement cycle of RRM measurement, whether the terminal device is required to perform RRM measurement, whether the terminal device is required to report a measurement result of RRM measurement, or a first measurement threshold for triggering the terminal device to perform the first operation.

In some embodiments, the first measurement threshold includes a threshold of an RSRP measurement value.

In some embodiments, the measurement cycle is related to one or more of: a paging detection cycle, a discontinuous reception DRX cycle, or positioning information of the terminal device.

In some embodiments, whether the terminal device is required to report the measurement result of the RRM measurement is determined based on a result of comparison between the measurement result and the second measurement threshold.

In some embodiments, in a case that a difference between the measurement result and a result of historical RRM measurement is greater than or equal to the second measurement threshold, the terminal device is required to report the measurement result.

In some embodiments, in a case that the first operation is related to access of the terminal device, the first information is used to indicate one or more of: information about whether the terminal device is required to perform access or information about a cell reselected for the terminal device.

In some embodiments, in a case that the first operation is related to the transmit beam, the first information is used to indicate one or more of: beam information of a transmit beam of an access network device relative to the terminal device, or beam information of a transmit beam of the terminal device relative to an access network device.

In some embodiments, in a case that the first operation is related to the receive beam, the first information is used to indicate one or more of: beam information of a receive beam of an access network device relative to the terminal device, or beam information of a receive beam of the terminal device relative to an access network device.

In some embodiments, the beam information includes an angle and/or a width of a corresponding beam.

In some embodiments, in a case that the first operation is related to the TA, the first information is used to indicate estimation information, estimated by the positioning server, about adjusting the TA by the terminal device.

In some embodiments, the positioning server 300 further includes a first receiving unit, receiving a TA value of the terminal device in a cell to which the terminal device belongs.

In some embodiments, the positioning server 300 further includes a determining unit, determining, based on the TA value of the terminal device in the cell to which the terminal device belongs, whether the TA is adjusted by the terminal device.

In some embodiments, the determining unit is specifically configured to: in a case that a first formula is met, determine, by the positioning server, that the TA is adjusted by the terminal device, where the first formula is d−Δd−TA_old>n× ΔTA, dis a propagation delay that includes a TA and that is reported by the cell to which the terminal device belongs, TA_old is the TA value of the terminal device in the cell to which the terminal device belongs, Δd is a propagation delay estimated by the positioning server, ΔTA is a quantization interval of the TA, and n is a number greater than 0.

In some embodiments, the estimation information includes an indication of whether the terminal device adjusts the TA or a TA value adjusted by the terminal device.

In some embodiments, the first information is indicated in one or more of the following manners: a sequence or a paging early indication PEI.

Figure 4:
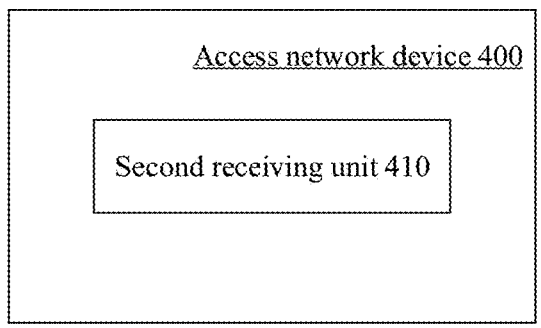
FIG. 4 is a schematic structural diagram of an access network device according to an embodiment of the present application.

FIG. 4 is a schematic structural diagram of an access network device 400 according to an embodiment of the present application. The access network device 400 may include a second receiving unit 410.

The second receiving unit 410 is configured to receive first information transmitted by a positioning server. The first information is associated with a terminal device, the first information is used to indicate a first operation, and the first operation is related to one or more of the following: RRM measurement, access of the terminal device, a transmit beam, a receive beam, or a TA.

In some embodiments, the access network device includes one or more of the following devices: an access network device corresponding to one or more serving cells of the terminal device, an access network device corresponding to a cell to be accessed by the terminal device, or an access network device corresponding to one or more neighboring cells of the terminal device.

In some embodiments, the first operation is determined based on a parameter change of the terminal device, and the parameter change of the terminal device is determined by the positioning server based on a location estimation of the terminal device or a measurement object for location estimation of the terminal device.

In some embodiments, the first information is determined based on one or more of: cell information of a cell to which the terminal device belongs, where the cell to which the terminal device belongs includes a cell that covers the terminal device; or information about the terminal device.

In some embodiments, the cell information includes measurement information of a first signal in the cell to which the terminal device belongs.

In some embodiments, the first signal includes one or more of the following signals: an SSB, a CSI-RS, or a CRS.

In some embodiments, the measurement information includes one or more of the following measurement results: RSRP, RSRQ, an RSSI, or a SINR.

In some embodiments, the information about the terminal device includes one or more of: power consumption information of the terminal device or positioning information of the terminal device.

In some embodiments, the positioning information of the terminal device includes fingerprint information used to position the terminal device, mobility information of the terminal device, and positioning deviation information of the terminal device.

In some embodiments, in a case that the first operation is related to RRM measurement, the first information is used to indicate one or more of: a measurement cycle of RRM measurement, whether the terminal device is required to perform RRM measurement, whether the terminal device is required to report a measurement result of RRM measurement, or a first measurement threshold for triggering the terminal device to perform the first operation.

In some embodiments, the first measurement threshold includes a threshold of an RSRP measurement value.

In some embodiments, the measurement cycle is related to one or more of: a paging detection cycle, a discontinuous reception DRX cycle, or positioning information of the terminal device.

In some embodiments, whether the terminal device is required to report the measurement result of the RRM measurement is determined based on a result of comparison between the measurement result and the second measurement threshold.

In some embodiments, in a case that a difference between the measurement result and a result of historical RRM measurement is greater than or equal to the second measurement threshold, the terminal device is required to report the measurement result.

In some embodiments, in a case that the first operation is related to access of the terminal device, the first information is used to indicate one or more of: information about whether the terminal device is required to perform access or information about a cell reselected for the terminal device.

In some embodiments, in a case that the access network device corresponds to the serving cell of the terminal device, the access network device further includes a second transmitting unit, transmitting a paging instruction, where the paging instruction is used to page the terminal device to perform access.

In some embodiments, in a case that the first operation is related to the transmit beam, the first information is used to indicate one or more of: beam information of a transmit beam of the access network device relative to the terminal device, or beam information of a transmit beam of the terminal device relative to the access network device.

In some embodiments, in a case that the first operation is related to the receive beam, the first information is used to indicate one or more of: beam information of a receive beam of the access network device relative to the terminal device, or beam information of a receive beam of the terminal device relative to the access network device.

In some embodiments, the beam information includes an angle and/or a width of a corresponding beam.

In some embodiments, in a case that the first operation is related to TA adjustment, the first information is used to indicate estimation information, estimated by the positioning server, about adjusting the TA by the terminal device.

In some embodiments, the estimation information includes an indication of whether the terminal device adjusts the TA or a TA value adjusted by the terminal device.

In some embodiments, the first information is indicated in one or more of the following manners: a sequence or a PEI.

Figure 5:
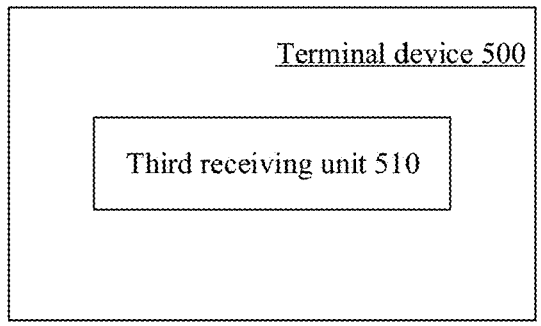
FIG. 5 is a schematic structural diagram of a terminal device according to an embodiment of the present application.

FIG. 5 is a schematic structural diagram of a terminal device 500 according to an embodiment of the present application. The terminal device 500 may include a third receiving unit 510.

The third receiving unit 510 is configured to receive first information transmitted by a positioning server. The first information is associated with a terminal device, the first information is used to indicate a first operation, and the first operation is related to one or more of the following: RRM measurement, access of the terminal device, a transmit beam, a receive beam, or a TA.

In some embodiments, the first operation is determined based on a parameter change of the terminal device, and the parameter change of the terminal device is determined by the positioning server based on a location estimation of the terminal device or a measurement object for location estimation of the terminal device.

In some embodiments, the first information is determined based on one or more of: cell information of a cell to which the terminal device belongs, where the cell to which the terminal device belongs includes a cell that covers the terminal device; or information about the terminal device.

In some embodiments, the cell information includes measurement information of a first signal in the cell to which the terminal device belongs.

In some embodiments, the first signal includes one or more of the following signals: an SSB, a CSI-RS, or a CRS.

In some embodiments, the measurement information includes one or more of the following measurement results: RSRP, RSRQ, an RSSI, or a SINR.

In some embodiments, the information about the terminal device includes one or more of: power consumption information of the terminal device or positioning information of the terminal device.

In some embodiments, the positioning information of the terminal device includes fingerprint information used to position the terminal device, mobility information of the terminal device, and positioning deviation information of the terminal device.

In some embodiments, in a case that the first operation is related to RRM measurement, the first information is used to indicate one or more of: a measurement cycle of RRM measurement, whether the terminal device is required to perform RRM measurement, whether the terminal device is required to report a measurement result of RRM measurement, or a first measurement threshold for triggering the terminal device to perform the first operation.

In some embodiments, the first measurement threshold includes a threshold of an RSRP measurement value.

In some embodiments, the measurement cycle is related to one or more of: a paging detection cycle, a discontinuous reception DRX cycle, or positioning information of the terminal device.

In some embodiments, whether the terminal device is required to report the measurement result of the RRM measurement is determined based on a result of comparison between the measurement result and the second measurement threshold.

In some embodiments, in a case that a difference between the measurement result and a result of historical RRM measurement is greater than or equal to the second measurement threshold, the terminal device is required to report the measurement result.

In some embodiments, in a case that the first operation is related to access of the terminal device, the first information is used to indicate one or more of: information about whether the terminal device is required to perform access or information about a cell reselected for the terminal device.

In some embodiments, the terminal device further includes a fourth receiving unit, receiving a paging instruction. The paging instruction is transmitted by an access network device corresponding to the serving cell of the terminal device, and the paging instruction is used to page the terminal device to perform access.

In some embodiments, in a case that the first operation is related to the transmit beam, the first information is used to indicate one or more of: beam information of a transmit beam of the access network device relative to the terminal device; or beam information of a transmit beam of the terminal device relative to an access network device.

In some embodiments, in a case that the first operation is related to the receive beam, the first information is used to indicate one or more of: beam information of a receive beam of the access network device relative to the terminal device; or beam information of a receive beam of the terminal device relative to the access network device.

In some embodiments, the beam information includes an angle and/or a width of a corresponding beam.

In some embodiments, in a case that the first operation is related to TA adjustment, the first information is used to indicate estimation information, estimated by the positioning server, about whether the TA is adjusted by the terminal device.

In some embodiments, the estimation information includes an indication of whether the terminal device adjusts the TA or a TA value adjusted by the terminal device.

In some embodiments, the first information is indicated in one or more of the following manners: a sequence or a paging early indication PEI.

In an optional embodiment, the first transmitting unit, the first receiving unit, the second transmitting unit, and the third receiving unit may each be a transceiver 630. The positioning server 300, the access network device 400, or the terminal device 500 may further include a memory 620 and/or a processor 610, which are specifically shown in FIG. 6.

Figure 6:
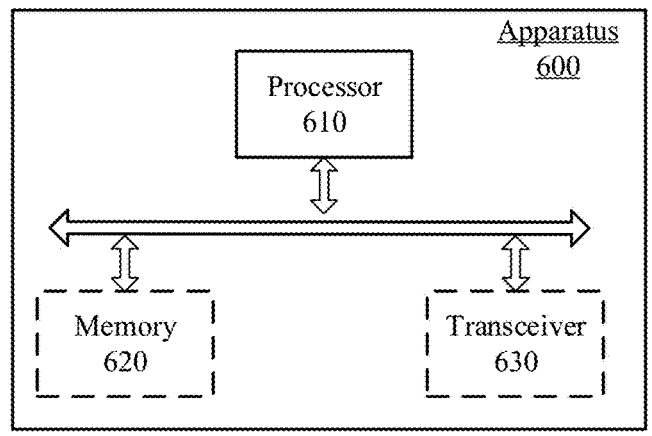
FIG. 6 is a schematic structural diagram of an apparatus for communication according to an embodiment of the present application.

FIG. 6 is a schematic structural diagram of an apparatus for communication according to an embodiment of the present application. The dashed line in FIG. 6 indicates that the unit or module is optional. The apparatus 600 may be configured to implement the method described in the foregoing method embodiments. The apparatus 600 may be a chip, a terminal device, or a network device.

The apparatus 600 may include one or more processors 610. The processor 610 may support the apparatus 600 to implement the method described in the foregoing method embodiments. The processor 610 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 600 may further include one or more memories 620. The memory 620 stores a program, and the program may be executed by the processor 610, so that the processor 610 performs the method described in the foregoing method embodiments. The memory 620 may be independent of the processor 610 or may be integrated into the processor 610.

The apparatus 600 may further include a transceiver 630. The processor 610 may communicate with another device or chip by using the transceiver 630. For example, the processor 610 may transmit data to and receive data from another device or chip through the transceiver 630.

An embodiment of the present application further provides a computer-readable storage medium for storing a program. The computer-readable storage medium may be applied to a terminal or a network device provided in the embodiments of the present application, and the program causes a computer to perform the methods to be performed by the terminal or the network device in various embodiments of the present application.

An embodiment of the present application further provides a computer program product. The computer program product includes a program. The computer program product may be applied to a terminal or a network device provided in the embodiments of the present application, and the program causes a computer to perform the methods to be performed by the terminal or the network device in various embodiments of the present application.

An embodiment of the present application further provides a computer program. The computer program may be applied to a terminal or a network device provided in the embodiments of the present application, and the computer program causes a computer to execute the methods to be executed by the terminal or the network device in various embodiments of the present application.

It should be understood that the terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In the embodiments of the present application, "B corresponding to A" means that B is associated with A, and B may be determined based on A. However, it should be further understood that, determining B based on A does not mean determining B based only on A, but instead, B may be determined based on A and/or other information.

In the embodiments of the present application, the term "correspond" may mean that there is a direct or indirect correspondence between the two, or may mean that there is an association relationship between the two, or may mean that there is a relationship such as indicating and being indicated, or configuring and being configured.

In the embodiments of the present application, "pre-definition" or "pre-configuration" may be implemented by pre-storing corresponding code or a corresponding table in a device (for example, including a terminal device and a network device) or in other manners that may be used for indicating related information. A specific implementation thereof is not limited in the present application. For example, predefining may indicate being defined in a protocol.

In the embodiments of the present application, the "protocol" may indicate a standard protocol in the communications field, which may include, for example, an LTE protocol, an NR protocol, and a related protocol applied to a future communications system. This is not limited in the present application.

In the embodiments of the present application, the term "and/or" is merely an association relationship that describes associated objects, and represents that there may be three relationships. For example, A and/or B may represent three cases: only A exists, both A and B exist, and only B exists. In addition, the character "/" in the specification generally indicates an "or" relationship between the associated objects.

In the embodiments of the present application, the "include" may refer to direct inclusion, or may refer to indirect inclusion. Optionally, the term "include" mentioned in the embodiments of the present application may be replaced with "indicate" or "be used to". For example, A including B may be replaced with that A indicates B, or A is used to determine B.

In the embodiments of the present application, sequence numbers of the foregoing processes do not mean execution sequences. The execution sequences of the processes should be determined based on functions and internal logic of the processes, and should not be construed as any limitation on the implementation processes of the embodiments of the present application.

In the several embodiments provided in the present application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented as indirect couplings or communications connections through some interface, apparatuses or units, and may be implemented in electrical, mechanical, or other forms.

The units described as separate parts may or may not be physically separate, and parts displayed as units may or may not be physical units, and may be located at one position, or may be distributed on a plurality of network elements. Some or all of the units may be selected according to actual requirements to achieve the objectives of the solutions of embodiments.

In addition, functional units in the embodiments of the present application may be integrated into one processing unit, each of the units may exist alone physically, or two or more units are integrated into one unit.

All or some of the foregoing embodiments may be implemented by using software, hardware, firmware, or any combination thereof. When software is used for implementation, the implementation can be performed in a form of a computer program product in whole or in part. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center via a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

The foregoing descriptions are merely specific implementations of the present application, but the protection scope of the present application is not limited thereto. Any variation or replacement readily figured out by persons skilled in the art within the technical scope disclosed in the present application shall fall within the protection scope of the present application. Therefore, the protection scope of the present application shall be subject to the protection scope of the claims.

What is claimed is:

1. A method for communication, comprising:
   transmitting, by a positioning server, first information, wherein the first information is associated with a terminal device, the first information indicates a first operation, and the first operation is related to one or more of: radio resource management (RRM) measurement, access of the terminal device, a transmit beam, a receive beam, or a timing advance (TA), wherein the first operation is related to the RRM measurement, and the first information indicates one or more of:
      a measurement cycle of the RRM measurement;
      whether the terminal device is required to perform the RRM measurement;
      whether the terminal device is required to report a measurement result of the RRM measurement; or
      a first measurement threshold for triggering the terminal device to perform the first operation; and
   wherein whether the terminal device is required to report the measurement result of the RRM measurement is determined based on a result of comparison between the measurement result and a second measurement threshold.

2. The method according to claim 1, wherein the transmitting, by a positioning server, first information comprises:
   transmitting, by the positioning server, the first information to at least one of the terminal device or an access network device,
   wherein the access network device comprises one or more of: an access network device corresponding to one or more serving cells of the terminal device, an access network device corresponding to a cell to be accessed by the terminal device, or an access network device corresponding to one or more neighboring cells of the terminal device.

3. The method according to claim 1, wherein the first operation is determined based on a parameter change of the terminal device, and the parameter change of the terminal device is determined by the positioning server based on a location estimation of the terminal device or a measurement object for location estimation of the terminal device.

4. The method according to claim 1, wherein the first information is determined based on one or more of:
   cell information of a cell to which the terminal device belongs, wherein the cell to which the terminal device belongs comprises a cell that covers the terminal device; or
   information about the terminal device.

5. The method according to claim 4, wherein the cell information comprises measurement information of a first signal in the cell to which the terminal device belongs.

6. The method according to claim 5, wherein the first signal comprises one or more of following signals: a synchronization signal/PBCH block (SSB), a channel state information reference signal (CSI-RS), or a cell-specific reference signal (CRS).

7. The method according to claim 1, wherein the measurement cycle is related to one or more of: a paging detection cycle, a discontinuous reception (DRX) cycle, or positioning information of the terminal device.

8. The method according to claim 1, wherein in a case that the first operation is related to access of the terminal device, the first information indicates one or more of:
   whether the terminal device is required to perform access; or
   information about a cell reselected for the terminal device.

9. The method according to claim 1, wherein in a case that the first operation is related to the transmit beam, the first information indicates one or more of:
   beam information of a transmit beam of an access network device relative to the terminal device; or
   beam information of a transmit beam of the terminal device relative to an access network device.

10. The method according to claim 1, wherein in a case that the first operation is related to the receive beam, the first information is used to indicate one or more of:
    beam information of a receive beam of an access network device relative to the terminal device; or
    beam information of a receive beam of the terminal device relative to an access network device.

11. The method according to claim 10, wherein the beam information comprises at least one of an angle or a width of a beam corresponding to the beam information.

12. The method according to claim 1, wherein in a case that the first operation is related to the TA, the first information indicates estimation information, estimated by the positioning server, about adjusting the TA by the terminal device.

13. The method according to claim 12, further comprising:
receiving, by the positioning server, a TA value of the terminal device in a cell to which the terminal device belongs.

14. The method according to claim 13, further comprising: determining, by the positioning server based on the TA value of the terminal device in the cell to which the terminal device belongs, whether the TA is adjusted by the terminal device.

15. The method according to claim 14, wherein the determining, by the positioning server, whether the TA is adjusted by the terminal device comprises:
in a case that a first formula is met, determining, by the positioning server, that the TA is adjusted by the terminal device,
wherein the first formula is d−Δd−TA_old>n×ΔTA, d is a propagation delay corresponding to the TA value of the terminal device in the cell to which the terminal device belongs, TA_old is the TA value of the terminal device in the cell to which the terminal device belongs, Δd is a propagation delay estimated by the positioning server, ΔTA is a quantization interval of the TA, and n is a number greater than 0.

16. The method according to claim 12, wherein the estimation information comprises one or more of: an indication of whether the TA is adjusted by the terminal device, or a TA value adjusted by the terminal device.

17. A method for communication, comprising:
receiving, by a terminal device, first information transmitted by network device,
wherein the first information is associated with the terminal device, the first information indicates a first operation, and the first operation is related to one or more of: radio resource management (RRM) measurement, access of the terminal device, a transmit beam, a receive beam, or a timing advance (TA), wherein the first operation is related to the RRM measurement, and the first information indicates one or more of:
a measurement cycle of the RRM measurement;
whether the terminal device is required to perform the RRM measurement;
whether the terminal device is required to report a measurement result of the RRM measurement; or
a first measurement threshold for triggering the terminal device to perform the first operation; and
determining whether to report the measurement result of the RRM measurement based on a result of comparison between the measurement result and a second measurement threshold.

18. An apparatus, comprises:
at least one processor;
one or more non-transitory computer-readable storage media coupled to the at least one processor and storing programming instructions for execution by the at least one processor, wherein the programming instructions, when executed, cause the apparatus to perform operations comprising:
receiving first information transmitted by a network device,
wherein the first information is associated with a terminal device, the first information indicates a first operation, and the first operation is related to one or more of: radio resource management (RRM) measurement, access of the terminal device, a transmit beam, a receive beam, or a timing advance (TA), wherein the first operation is related to the RRM measurement, and the first information indicates one or more of:
a measurement cycle of the RRM measurement;
whether the terminal device is required to perform the RRM measurement;
whether the terminal device is required to report a measurement result of the RRM measurement; or
a first measurement threshold for triggering the terminal device to perform the first operation; and
determining whether to report the measurement result of the RRM measurement based on a result of comparison between the measurement result and a second measurement threshold.

19. The apparatus according to claim 18, wherein the first information is determined based on one or more of:
cell information of a cell to which the terminal device belongs, wherein the cell to which the terminal device belongs comprises a cell that covers the terminal device; or
information about the terminal device.

20. The apparatus according to claim 19, wherein the cell information comprises measurement information of a first signal in the cell to which the terminal device belongs.

* * * * *